United States Patent [19]
Compton

[11] Patent Number: 5,799,186
[45] Date of Patent: Aug. 25, 1998

[54] METHOD AND APPARATUS FOR PROGRAMMING A PERIPHERAL PROCESSOR WITH A SERIAL OUTPUT MEMORY DEVICE

[75] Inventor: John T. Compton, LeRoy, N.Y.

[73] Assignee: Eastman Kodak Company, Rochester, N.Y.

[21] Appl. No.: 1,411

[22] Filed: Jan. 7, 1993

Related U.S. Application Data

[63] Continuation of Ser. No. 630,871, Dec. 20, 1990, abandoned.

[51] Int. Cl.[6] .................................................. G06F 9/06
[52] U.S. Cl. ................................... 395/652; 364/280.2
[58] Field of Search ........................ 395/200, 250, 395/275, 700, 325; 365/189.05, 221, 233, 238.5

[56] References Cited

U.S. PATENT DOCUMENTS

| | | | |
|---|---|---|---|
| 4,257,098 | 3/1981 | Lacy | 395/575 |
| 4,335,426 | 6/1982 | Maxwell et al. | 395/725 |
| 4,439,837 | 3/1984 | Aiena et al. | 395/700 |
| 4,597,058 | 6/1986 | Izumi et al. | 395/600 |
| 4,648,063 | 3/1987 | Strout | 364/421 |
| 4,654,799 | 3/1987 | Ogaki et al. | 364/479 |
| 4,672,554 | 6/1987 | Ogaki | 364/479 |
| 4,674,055 | 6/1987 | Ogaki et al. | 364/479 |
| 4,715,017 | 12/1987 | Iwahashi | 365/239 |
| 4,720,812 | 1/1988 | Kao et al. | 395/700 |
| 4,725,977 | 2/1988 | Izumi et al. | 395/425 |
| 4,745,577 | 5/1988 | Ogawa et al. | 365/78 |
| 4,794,567 | 12/1988 | Akatsuka | 365/189 |
| 4,847,812 | 7/1989 | Lodhi | 365/221 |
| 4,852,061 | 7/1989 | Baron et al. | 365/154 |
| 4,891,794 | 1/1990 | Hush et al. | 365/189.04 |
| 4,918,657 | 4/1990 | Tanahashi | 365/203 |
| 4,962,483 | 10/1990 | Lodhi | 365/221 |
| 4,970,694 | 11/1990 | Tanaka et al. | 365/233 |
| 5,016,226 | 5/1991 | Hiwada et al. | 365/233 |
| 5,018,111 | 5/1991 | Madland | 365/233 |
| 5,056,005 | 10/1991 | Kaneko et al. | 395/200 |
| 5,073,873 | 12/1991 | Nogami | 365/189.05 |
| 5,077,690 | 12/1991 | Smith | 365/201 |
| 5,097,447 | 3/1992 | Ogawa et al. | 365/200 |
| 5,136,546 | 8/1992 | Fununda et al. | 365/230.03 |
| 5,138,577 | 8/1992 | Oh | 365/189.05 |
| 5,142,637 | 8/1992 | Harlin et al. | 395/425 |
| 5,146,111 | 9/1992 | Ciraula et al. | 307/296.3 |
| 5,198,999 | 3/1993 | Abe et al. | 365/189.05 |
| 5,247,659 | 9/1993 | Curran et al. | 395/575 |
| 5,274,816 | 12/1993 | Oha | 395/700 |
| 5,280,627 | 1/1994 | Flaherty et al. | 395/700 |
| 5,291,585 | 3/1994 | Sato et al. | 395/500 |

OTHER PUBLICATIONS

Nader, J. A. Prentice Hall's Illustrated Dictionary of Computing (Englewood Cliffs, Prentice Hall, 1992) p. 223.

"Memory Products Data Book", Advanced Micro Devices, © 1989, pp. 4–35.

*Primary Examiner*—Lance Leonard Barry, Esq.
*Attorney, Agent, or Firm*—David M. Woods

[57] ABSTRACT

A serial output memory device is employed to reprogram a peripheral processor. The serial output memory device is addressed by a central processor and loaded with program instructions for the peripheral processor. The program instructions are serially retrieved from the serial output memory device and loaded into the peripheral processor's program address space.

9 Claims, 4 Drawing Sheets

METHOD AND APPARATUS FOR PROGRAMMING A PERIPHERAL PROCESSOR WITH A SERIAL OUTPUT MEMORY DEVICE

This is a Continuation of application Ser. No. 07/630,871 filed Dec. 20, 1990, now abandoned.

FIELD OF THE INVENTION

The invention is related in general to a method and apparatus for programming a peripheral processor. Specifically, the invention is related to a method and apparatus for programming a peripheral processor wherein a host processor loads program instructions into the peripheral processor's program address space using a serial output memory device.

BACKGROUND OF THE INVENTION

Special purpose processors devoted to digital signal processing, graphics and communications functions have become widely used to reduce the processing load or overhead of central or host processors in many data processing systems. The special purpose processors, generally referred to as peripheral or slave processors, are often preprogrammed to independently perform a special task specifically dedicated to the peripheral processor. For example, the peripheral processor may perform a desired calculation or control a peripheral device while the central or host processor simultaneously performs other tasks.

The program instructions for the peripheral processor have conventionally been stored in nonvolatile memory devices such as a ROM. It is desirable, however, to be able to dynamically program the peripheral processor to perform different functions or tasks in order to maximize the benefits of providing a peripheral processor in the data processing system. In other words, a single peripheral processor can be used to perform a number of different tasks as long as the tasks do not have to be performed simultaneously, if the peripheral processor can be continuously or dynamically reprogrammed to the perform new tasks. In order to accomplish dynamic programming, a method and apparatus must be provided to permit continual access and reprogramming of the peripheral processors program instructions.

Dynamic programming could be achieved by employing a volatile memory, such as a RAM device, to temporarily store the peripheral processor's programs instructions. In particular, a dual port RAM coupled to both the central processor and the peripheral processor can be used to receive and temporarily store the peripheral processor's program instructions. The central processor can access the RAM and update the program instructions stored therein to change the task to be performed by the peripheral processor.

U.S. Pat. No. 4,648,063 issued to Strout on Mar. 3, 1987, discusses a processing system that employs a volatile memory in a manner similar to that described above. A central computer loads a program for a peripheral computer into a volatile memory. The control of the volatile memory is then switched to a peripheral computer. The peripheral computer runs the program that was loaded by the central computer into the volatile memory to determine if the program is operational. If the program is not operational, control of the volatile memory is returned to the central computer which updates and corrects the program. The program is loaded into a nonvolatile memory associated with the peripheral computer once the program is established by the peripheral processor as being operational. The system permits the central computer to change the program to be run by the peripheral computer as operating requirements dictate. Thus, the peripheral processor can perform a number of different functions.

There are several disadvantages to the use of RAM devices as described above to provide dynamic reprogramming of a peripheral processor. For example, dual port RAM devices are relatively expensive when compared with other memory devices. The coupling of both the central and peripheral processors to a common RAM also requires complicated address multiplexing circuitry to permit both the central processor and the peripheral processor to address the common RAM. Accordingly, it would be desirable to provide a method and apparatus for dynamically programming a peripheral processor that overcomes the above-described disadvantages.

SUMMARY OF THE INVENTION

The present invention provides a method and apparatus for dynamically reprogramming a peripheral processor that utilizes a serial output memory device. The serial output memory device is addressed by the central processor and loaded with program instructions for the peripheral processor. The program instructions are serially retrieved from the serial output memory device and loaded into the peripheral processor's program address space. The serial output memory device eliminates the need for complicated addressing circuitry to permit the host and peripheral processors to access the device.

BRIEF DESCRIPTION OF THE DRAWINGS

With the above as background, reference should now be made to the detailed description of the preferred embodiment of the invention set forth below and the accompanying drawings in which.

DETAILED DESCRIPTION OF THE PREFERRED EMBODIMENT

The present invention is based on the recognition that the addressing complexities associated with a dual port RAM device can be eliminated by the utilization of serial output memory device, for example a video RAM (VRAM) or a FIFO buffer, that is loaded by the central or host processor with the program instructions for the peripheral processor. Once loaded, the serial output memory device is clocked to serially output the stored program instructions to the program address space of the peripheral processor. It should be noted that the phrase "serial output" as used herein refers to an output data stream of serial words or bytes and not to a serial bit stream. The provision of a serial output data stream eliminates the need for the peripheral processor to directly address the serial memory device to obtain the program instructions. In a preferred embodiment discussed below, a VRAM device is utilized as the serial output memory device. It will be understood, however, that the invention is not limited to the use of a VRAM and can be practiced with any type of memory device that provides a serial output data stream including a FIFO buffer.

Figure 1:
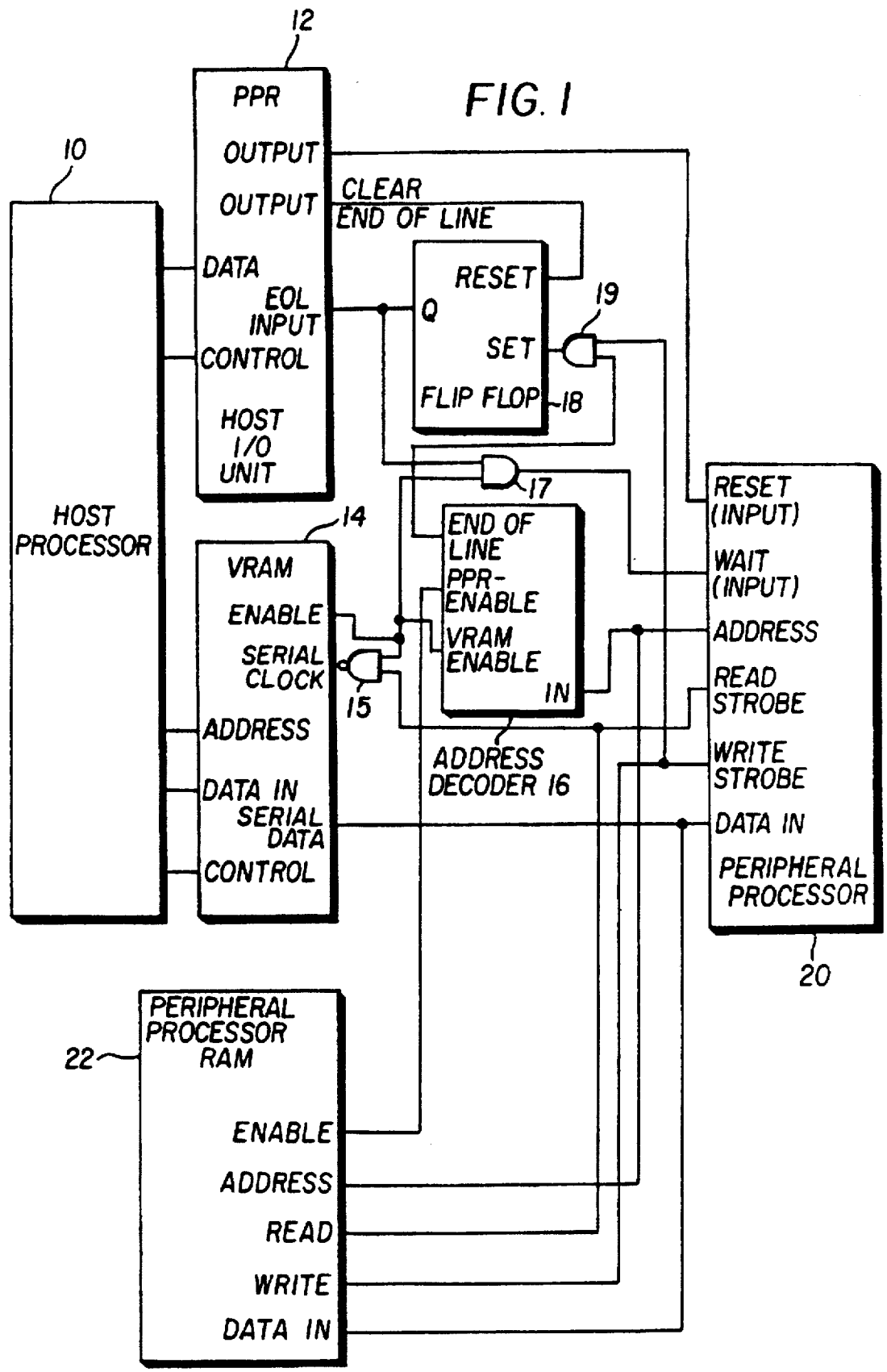
FIG. 1 illustrates a block diagram of a processing system accordance with the present invention.

Referring now to FIG. 1, a block diagram of a processing system in accordance with the present invention is shown including a host processor 10, a host I/O unit 12, a VRAM 14, an address decoder 16, a flip-flop 18, a peripheral processor 20, and a peripheral processor RAM 22. The DATA IN, ADDRESS and CONTROL lines of the VRAM 14 are coupled to the host processor 10, enabling the host processor 10 to load program instructions into the VRAM 14. The SERIAL DATA output line of the VRAM 14 is coupled to the DATA input line of the peripheral processor 20 and the peripheral processor RAM 22. It should be noted that the peripheral processor RAM 22, which constitutes the program address space for the peripheral processor 20, may be internal to the peripheral processor 22 even though it is shown as a separate device. A SERIAL CLOCK input of the VRAM 14 is coupled to the output of a NAND gate 15. The inputs of the NAND gate 15 are coupled to a READ STROBE line of the peripheral processor 20 and the ENABLE line of the VRAM 14. The ENABLE line of the VRAM 14 is also coupled to the VRAM ENABLE output of the address decoder 16 and one input of an AND gate 17. The second input to the AND gate 17 is coupled to the Q output of the flip-flop 18 and to an end of line input (EOL) of the host I/O unit 12. The output of the AND gate 17 is connected to the WAIT input line of the peripheral processor 20. The RESET input of the flip-flop 18 is connected to a CLEAR END_OF_LINE output of the host I/O unit 12. The SET input of the flip-flop 18 is coupled to the output of a second AND gate 19. The inputs to the second AND gate 19 are supplied from the WRITE STROBE line of the peripheral processor and the END_OF_LINE output of the address decoder 16. The address decoder 16 also supplies a peripheral processor RAM enable signal (PPRENABLE) to the peripheral processor RAM 22. The host processor 10 can reset the peripheral processor 20 by activating the peripheral processor reset output (PPR) of the host I/O unit 12.

Figure 2:
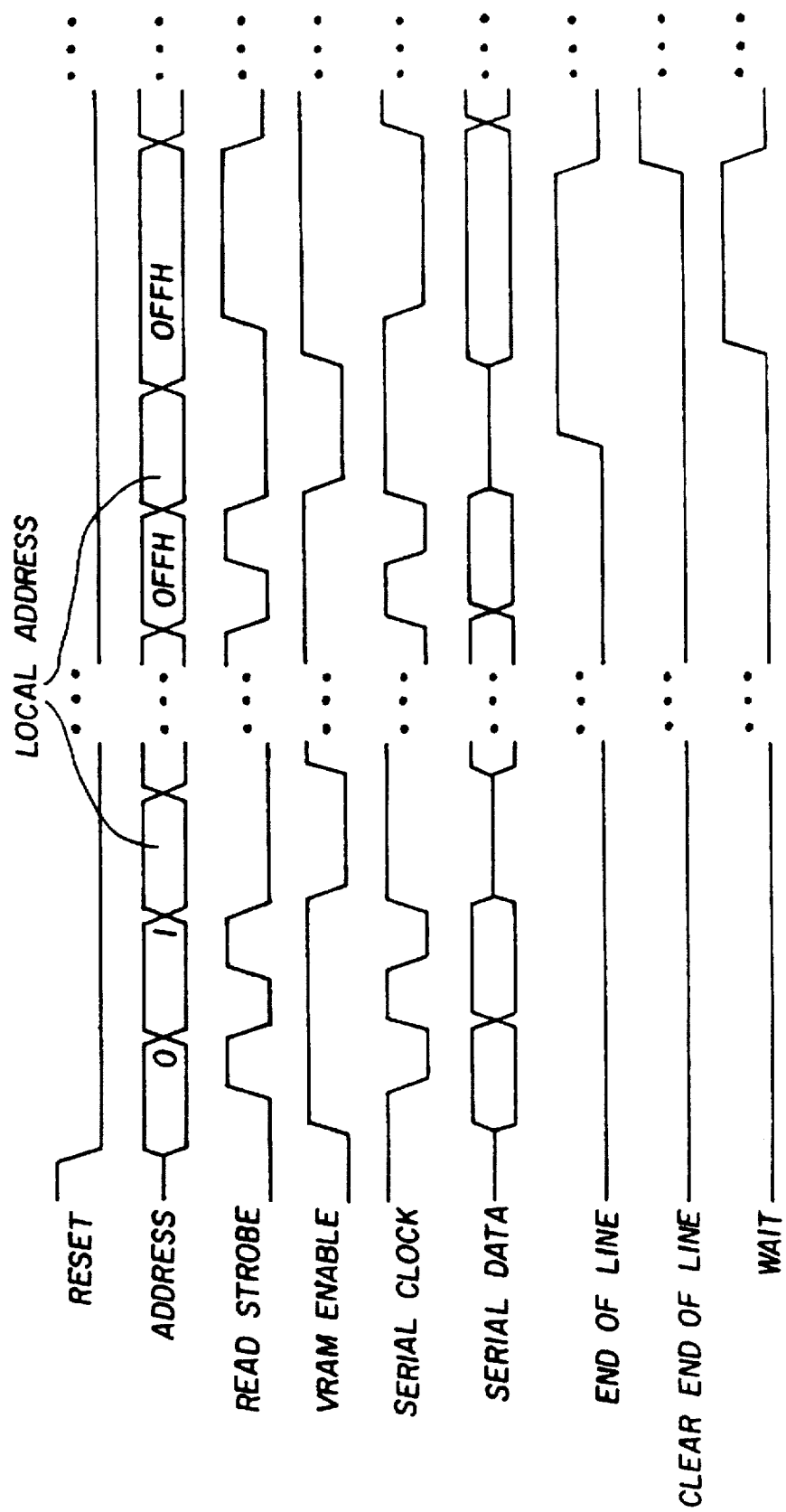
FIG. 2 illustrates a timing diagram for the processing system illustrated in FIGS. 3 and 4 are general flow diagrams illllustrating the operation for the processing system illustrated in FIG. 1.

The operation of the illustrated processing system will now be described in detail. The loading of the peripheral processor's program instructions is initiated when the host processor 10 resets the peripheral processor 20 by asserting the PPR output of the host I/O unit 12. The host processor 10 then begins the loading of the program instructions for the peripheral processor 20 into the VRAM 14. The program instructions are actually divided into a bootstrap program loader routine, a peripheral processor bootstrap program and a peripheral processor main program. In the illustrated embodiment, the program instructions must be loaded in segments as the VRAM 14 is not capable of holding all of the program instructions at one time (VRAM address is limited from 00H–FFH). The host processor 10 lowers the PPR output causing the RESET input of the peripheral processor 20 to be driven low, thereby initiating the operation of the peripheral processor 20 (See FIG. 2) once the VRAM 14 has been filled with program instructions. The peripheral processor 20 asserts the READ STROBE line and supplies a starting address (0000H) to the address decoder 16. The address decoder 16 in turn asserts the VRAM ENABLE output to enable operation of the serial output port of VRAM 14. In the illustrated embodiment, the VRAM ENABLE output will be asserted for addresses 0000H–00FFH. The high logic levels of the READ STROBE line and the VRAM ENABLE line cause the output of the NAND gate 15 to go low, thereby providing a serial clock pulse to the VRAM 14. As a result of the serial clock pulse, the first program instruction is output from the VRAM 14 and supplied to the peripheral processor 20. The above process continues until the peripheral processor 20 writes to a predefined END_OF_LINE address. The address decoder 16 drives the END_OF_LINE signal line to a logic high level when the END_OF_LINE address is received from the peripheral processor 20, which causes the output of the AND gate 19 to set the Q output of the flip-flop 18 to a high logic level. With the Q output and the VRAM ENABLE line set high, the output of AND gate 17 is driven high which causes the peripheral processor 20 to enter a wait state. At the same time, the host processor 10 detects the occurrence of the Q output of the flip-flop 18 going high through the EOL input line of the host I/O unit 12. The host processor 10 then reloads the VRAM 14 with the next group or segment of program instructions. Once the reloading is complete, the host processor 10 asserts the CLEAR END_OF_LINE output of the host I/O unit 12 causing the flip-flop 18 to reset and enabling the peripheral processor 20 to continue operation.

As will be described in greater detail below, the initial program instructions provided to the peripheral processor 20 consist of a bootstrap program loader routine which will cause the peripheral processor to load a peripheral processor bootstrap program into the peripheral processor RAM 22. Thus, the peripheral processor 20 continues to receive program instructions directly from the VRAM 14 until it has completely loaded the bootstrap program into the peripheral processor RAM 22. At that point, the last program instruction of the bootstrap program loader routine, a jump instruction, causes program execution in the peripheral processor 20 to jump to the starting address at which the bootstrap program has been stored in the peripheral processor RAM 22 (RAMSTART). The peripheral processor 20 then runs the bootstrap program stored in the peripheral processor RAM 22 (note the PPR-ENABLE line is asserted by the address decoder 16 for address RAMSTART and greater) to continue the loading of program instructions, which constitute the main peripheral processor program, from the VRAM 14 to the peripheral processor RAM 22. Once the loading of the main peripheral processor program has been completed, the peripheral processor 20 begins a normal mode of operation in which the main peripheral processor program is accessed from the peripheral processor RAM 22 and executed.

The operation of the peripheral processor 20 can be interrupted at any time by the host processor 10 by the activation of the RESET input of the peripheral processor 20. Thus, the host processor 10 can terminate execution of a first task and cause the peripheral processor RAM 22 to be reloaded with new program instructions that will cause the peripheral processor 20 to execute a second task. The operation of the peripheral processor 20 can therefore be continuously updated depending on the particular needs of the overall processing system.

The operation of the bootstrap loader routine will now be discussed with reference to the pseudo code listing set forth below.

| ADDRESS | INSTRUCTION | COMMENT |
| --- | --- | --- |
| 0000H | MVI RAMSTART | Move immediate first instruction of bootstrap program to location RAMSTART; |
| 0001H | MVI RAMSTART +1 | Move second instruction of bootstrap program to location RAMSTART +1; |
| 0002H | MVI RAMSTART +2 | Move third instructions of bootstrap program to location RAMSTART +2; |

-continued

| ADDRESS | INSTRUCTION | COMMENT |
|---|---|---|
| ... | ... | ... |
| 00FEH | JUMP 0 | Jump to 0 if VRAM address space is confined to 0-0FFH |
| 0000H | SET | Set flip-flop by writing to END_OF_LINE; |
| 0001H | MVI RAMSTART +0FDH | Move 253rd instruction to location RAMSTART 253; |
| ... | ... | ... |
| | JUMP RAMSTART END | Last instruction |

As is illustrated by the pseudo code listing, the bootstrap program loader routine starts at the reset address location (0000H) of the peripheral processor 20 and includes a number of move immediate instructions. As will be well understood by those of ordinary skill in the art, a move immediate instruction includes a specified address location and a data word that is to be moved to the specified address location. In this case, the data word is an instruction of the bootstrap program. Thus, the move immediate instructions cause the peripheral processor to load the program instructions for the peripheral processor bootstrap program into the peripheral processor RAM beginning at address RAMSTART. The last available instruction from the VRAM 14, namely SET causes the address decoder 16 to assert the END_OF_LINE output, which in turn, sets flip-flop 18; a subsequent access by the peripheral processor 20 to the VRAM 14 causes the peripheral processor 20 to enter a wait state. The host processor 10 can then access the VRAM 14 and reload it with additional program instructions. Once reloading of the VRAM 14 is complete, the peripheral processor 20 continues the loading of the bootstrap program instructions. The last instruction of the bootstrap loader routine is a JUMP instruction which causes the peripheral processor to jump to location RAMSTART, namely, the starting address of the peripheral processor bootstrap program. At this point, the peripheral processor 20 begins execution of the peripheral processor bootstrap program and discontinues the direct reception of program instructions from the VRAM. The bootstrap program instructs the peripheral processor 20 to load program instructions from the VRAM 14 into the peripheral processor RAM 22 at address locations reserved for the main peripheral processor program. The last program instruction of the bootstrap program is a jump to the starting address of the main program.

Figure 3:
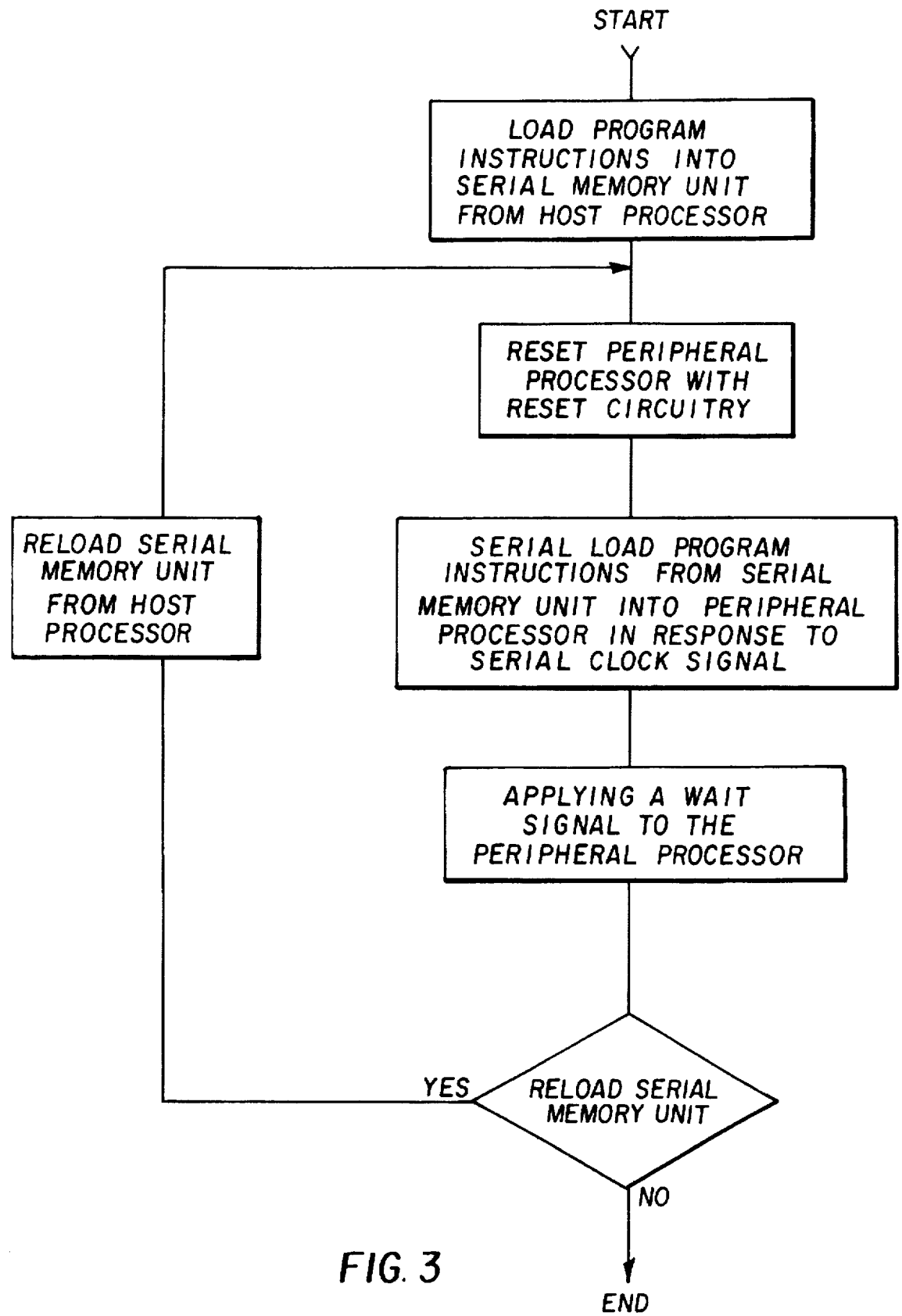
Figure 4:
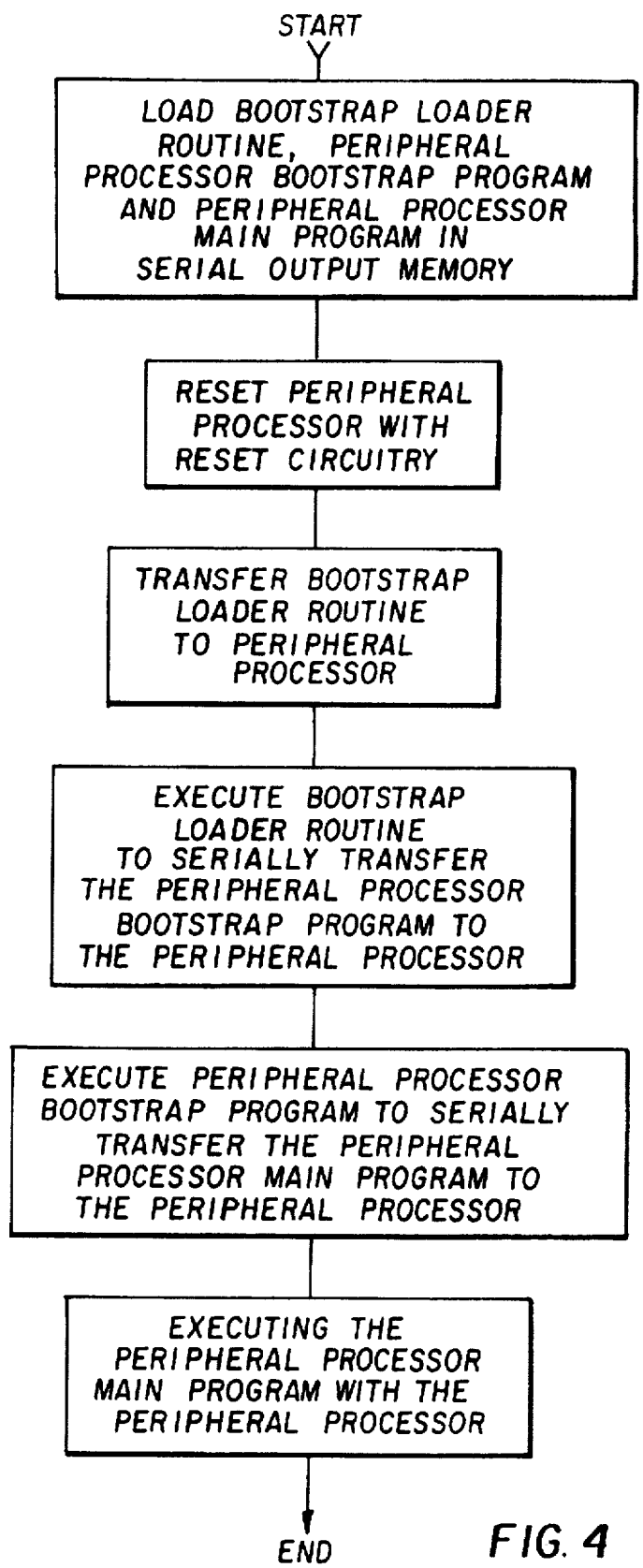

It will be apparent to one of ordinary skill in the art that the particular commands and structure of the bootstrap program loader routine may vary depending on the type of processors employed. Specific examples of a bootstrap program loader routine and bootstrap program are provided in Appendices A and B which are included as part of this specification. General flow diagrams illustrating the operation of the system are illustrated in FIGS. 3 and 4.

The invention has been described with reference to certain preferred embodiments thereof. It will be understood, however, that modifications and variations are possible within the scope of the appended claims. For example, although the illustrated embodiment incorporates a VRAM, any type of serial output memory device can be utilized including a FIFO buffer. In addition, a bidirectional bus buffer (74HC646) could be used as the interface between the host and peripheral processors. In such a case, the flip flop would get set each time the peripheral processor reads a byte from the bus buffer and the host processor would reset the flip flop after loading each byte. In addition, the invention is also not limited to the specific circuit implementation disclosed. Modification of the circuit configuration and elements are possible. Finally, the present invention is generally applicable to any type of processing system requiring the use of a peripheral processor.

It should also be noted that a portion of this specification contains material which is subject to copyright protection. The copyright owner has no objection to the facsimile reproduction by anyone of the this specification as it appears in the files of the United States Patent and Trademark office, but otherwise reserves all copyrights whatsoever.

APPENDIX A
BOOTSTRAP PROGRAM LOADER ROUTINE FOR A Z80

| Address | Instruction | Mnemonics | Comments |
|---|---|---|---|
| 0000 | 21 00 80 | LD HL, 8000H | Assumes that the Peripheral Processor RAM starts at 8000H. This sets up the pointer to where the bootstrap program loader goes. |
| 0003 | 36 32 | LD (HL), 32H | First byte of first instruction. |
| 0005 | 23 | INC HL | Point to the next RAM location |
| 0006 | 36 00 | LD (HL), 00H | Second byte of first instruction. |
| 0008 | 23 | INC HL | Point to the next RAM location. |
| 0009 | 36 F0 | LD (HL), 0F0H | At this point the instruction 32 00 F0 - LD (0F000H), A has been placed at location 8000H. |
| 0.00B | 23 | INC HL | Point to the next RAM location. |
| 000C | 36 1A | LD (HL), 1AH | |
| 000E | 23 | INC HL | Point to the next RAM location. |
| 000F | 36 77 | LD (HL), 77H | |
| 0011 | 23 | INC HL | Point to the next RAM location. |
| 0012 | 36 23 | LD (HL), 23H | |
| 0014 | 23 | INC HL | Point to the next RAM location. |
| 0015 | 36 10 | LD (HL), 10H | |
| 0017 | 23 | INC HL | Point to the next RAM location. |
| 0018 | 36 FD | LD (HL), 0FDH | |
| 001A | 23 | INC HL | Point to the next RAM location |
| 001B | 36 0D | LD (HL), 0DH | |
| 001D | 23 | INC HL | Point to the next RAM location |
| 001E | 36 C2 | LD (HL), 0C2H | |
| 0020 | 23 | INC HL | Point to the next RAM location. |
| 0021 | 36 00 | LD (HL), 00H | |
| 0023 | 23 | INC HL | Point to the next RAM location. |
| 0024 | 36 80 | LD (HL), 80H | |
| 0026 | 23 | INC HL | Point to the next RAM location. |
| 0027 | 11 00 00 | LD DE, 000H | Sets up a pointer so that the bootstrap load can continue to access data from the serial data port. |
| 002A | 7F 03 | LD C, 3 | Set up to load 3 256 byte blocks. |
| 002C | 06 00 | LD B, 0 | Set up B to be a byte counter. |

-continued

APPENDIX A
BOOTSTRAP PROGRAM LOADER ROUTINE FOR A Z80

| Address | Instruction | Mnemonics | Comments |
|---------|-------------|-----------|----------|
| 002E | C3 00 80 | JP 8000H | Jump to the bootstrap loader. |

APPENDIX B
BOOTSTRAP PROGRAM FOR A Z80

| Address | Instruction | Mnemonics | Comments |
|---------|-------------|-----------|----------|
| 8000 | 32 00 F0 | LD (0F000H), A | Dummy write sets END_OF_LINE flip flop. |
| 8003 | 1A | LD A, (DE) | Read from serial data port. Note that this access will cause the processor to enter wait states until the host clears the END_OF_LINE flip flop. |
|  |  | LOOP: |  |
| 8004 | 77 | LD (HL), A | Write it to RAM. |
| 8005 | 23 | INC HL | Point to next RAM location. |
| 8006 | 10 FD | DJNZ −3 | Decrement the B register; if it is not zero go to LOOP. |
| 8008 | 0D | DEC C | Decrement the C register. |
| 8009 | C2 00 80 | JPNZ 8000H | If the C register is not zero, L go set the END_OF_LINE flip flop and resume loading. Note that in this example, the peripheral processor will load 3–256 byte blocks. The number 3 is arbitrary in this example. It is possible to construct the loader in such a way as to offer more flexibility in program size and location. |
| 800C |  |  | The rest of the program is loaded starting at this address. |

What is claimed is:

1. An apparatus comprising:

a host processor and a peripheral processor;

a peripheral processor memory unit coupled to said peripheral processor;

a serial output memory unit coupled to the host processor and the peripheral processor, wherein the serial output memory unit generates an output data stream of serial words in response to a serial clock signal;

address decoding circuitry coupled to the peripheral processor, the peripheral processor memory unit, and the serial output memory unit, wherein the address decoding circuitry supplies a first enable signal to the serial output memory unit when the address decoding circuitry receives addresses of a first selected group of addresses from the peripheral processor and the address decoding circuitry supplies a second enable signal to the peripheral processor memory unit when the address decoding circuitry receives addresses of a second selected group of addresses from the peripheral processor;

reset circuitry coupled to the host processor, the peripheral processor and the address decoding circuitry, wherein the reset circuitry supplies a reset signal to the peripheral processor in response to a control signal from the host processor and supplies a wait signal to the peripheral processor in response to a signal received from the address decoding circuitry; and means coupled to the serial output memory unit for supplying a serial clock signal to the serial output memory unit when said first enable signal is supplied to the serial output memory unit and a read strobe signal is supplied to the serial clocking means by the peripheral processor;

wherein the serial output memory unit receives and stores bootstrap program instructions and main program instructions from the host processor in response to a control signal generated by the host processor, and supplies a serial output data stream, comprising the bootstrap program instructions, to the peripheral processor in response to the first enable signal and the serial clock signal;

wherein the peripheral processor serially executes each of the bootstrap program instructions as they are received from the serial output memory unit and supplies the second selected group of addresses to the address decoding circuitry in response to the execution of at least one of the bootstrap program instructions; and wherein the address decoding circuitry supplies the second enable signal to the peripheral processor memory unit thereby enabling the peripheral processor memory unit to receive and store the main program instructions at address locations specified by the peripheral processor.

2. An apparatus as claimed in claim 1, wherein said reset circuitry includes a host I/O unit coupled to the host processor and the peripheral processor, and a reset flip-flop coupled to the host I/O unit and the peripheral processor, wherein the host I/O unit generates the reset signal supplied to the peripheral processor by the reset circuitry in response to the control signal received from the host processor by the reset circuitry.

3. An apparatus as claimed in claim 1, wherein the serial output memory unit comprises a video random access memory.

4. An apparatus as claimed in claim 1, wherein the serial output memory unit comprises a first-in-first-out buffer.

5. A method of loading program instructions for a peripheral processor comprising the steps of:

storing a plurality of program instructions in a serial output memory unit by means of a host processor coupled to the serial output memory unit, the program instructions including a bootstrap loader routine, a peripheral processor bootstrap program, and a peripheral processor main program;

resetting a peripheral processor coupled to a serial output of the serial output memory unit by means of reset circuitry coupled to the peripheral processor;

selectively enabling the serial output memory unit by means of enabling circuitry coupled to the serial output memory unit;

serially transferring program instructions corresponding to the bootstrap loader routine to the peripheral processor from the serial output memory unit in response to a serial clocking signal supplied to the serial output memory unit from a serial clocking circuit coupled to the serial output memory unit;

serially executing the program instructions corresponding to the bootstrap loader routine with the peripheral processor as the program instructions are received from the serial output memory unit to serially transfer program instructions that correspond to the peripheral processor bootstrap program from the serial output memory unit to a peripheral processor memory unit that is coupled to the peripheral processor and selectively enabled by the enabling circuitry;

executing the program instructions corresponding to the peripheral processor bootstrap program that have been transferred to the peripheral processor memory unit with the peripheral processor to serially transfer program instructions that correspond to the peripheral processor main program from the serial output memory unit to the peripheral processor memory unit.

6. A method of loading program instructions for a peripheral processor as claimed in claim 5, further comprising the step of executing the peripheral processor main program with the peripheral processor.

7. An apparatus comprising:

a host processor and a peripheral processor;

a peripheral processor memory unit coupled to said peripheral processor;

a serial output memory unit coupled to the host processor and the peripheral processor, wherein the serial output memory unit generates an output data stream of serial words in response to a serial clock signal;

address decoding circuitry coupled to the peripheral processor, the peripheral processor memory unit, and the serial output memory unit, wherein the address decoding circuitry supplies a first enable signal to the serial output memory unit when the address decoding circuitry receives addresses of a first selected group of addresses from the peripheral processor and the address decoding circuitry supplies a second enable signal to the peripheral processor memory unit when the address decoding circuitry receives addresses of a second selected group of addresses from the peripheral processor; and means coupled to the serial output memory unit for supplying a serial clock signal to the serial output memory unit when said first enable signal is supplied to the serial output memory unit and a read strobe signal is supplied to the serial clock signal means by the peripheral processor;

wherein the serial output memory unit receives and stores bootstrap program instructions and main program instructions from the host processor in response to a control signal generated by the host processor, and supplies a serial output data stream, comprising the bootstrap program instructions, to the peripheral processor in response to the first enable signal and the serial clock signal;

wherein the peripheral processor serially executes each of the bootstrap program instructions as they are received from the serial output memory unit and supplies the second selected group of addresses to the address decoding circuitry in response to the execution of at least one of the bootstrap program instructions; and wherein the address decoding circuitry supplies the second enable signal to the peripheral processor memory unit thereby enabling the peripheral processor memory unit to receive and store the main program instructions at address locations specified by the peripheral processor.

8. An apparatus as claimed in claim 7, wherein the serial output memory unit comprises a video random access memory.

9. An apparatus as claimed in claim 7, wherein the serial output memory unit comprises a first-in-first-out buffer.

* * * * *